Patented Nov. 14, 1950

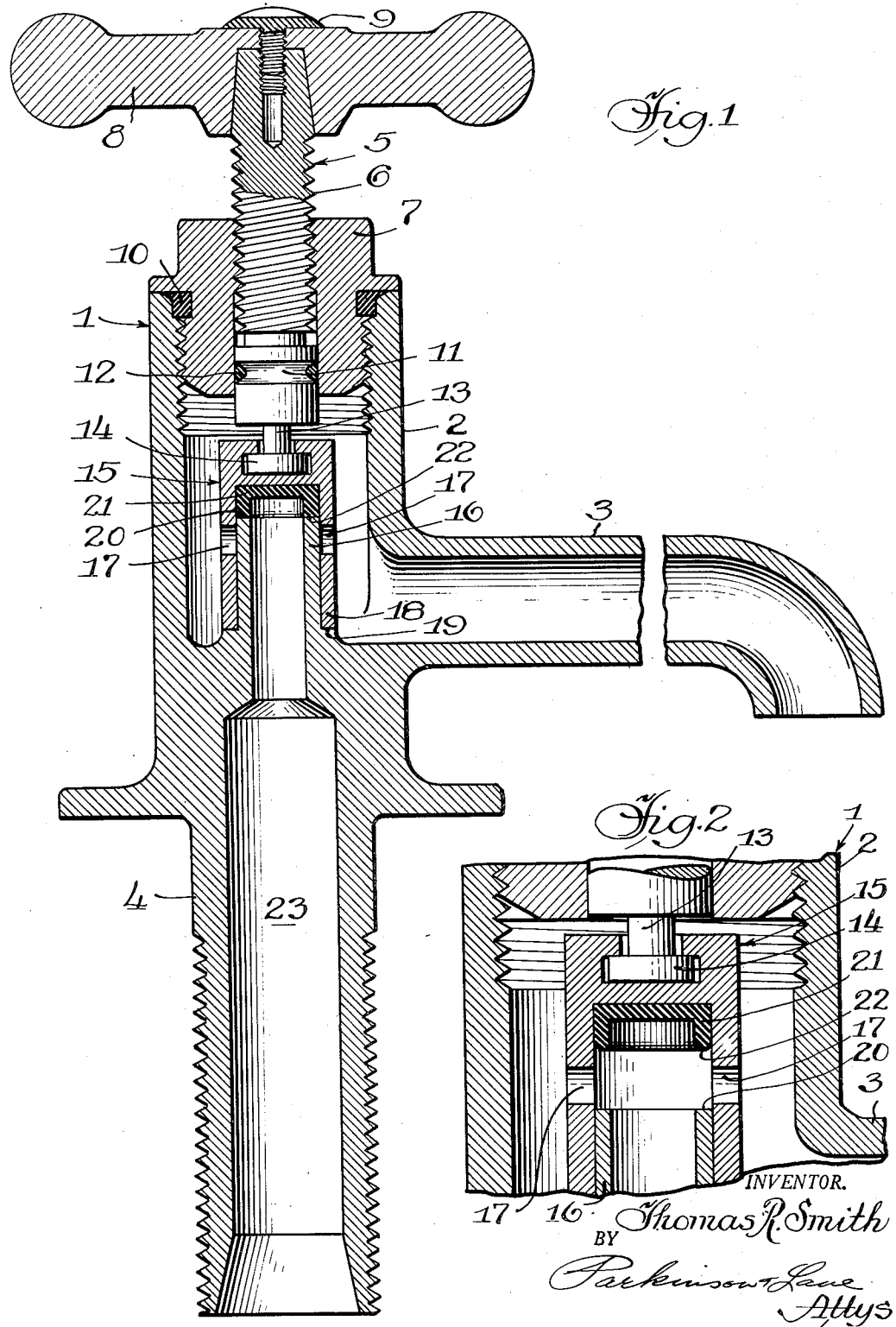

2,530,090

UNITED STATES PATENT OFFICE 2,530,090

FAUCET WITH NONEXTRUDING SEAL

Thomas R. Smith, Newton, Iowa, assignor to The Maytag Company, Newton, Iowa, a corporation of Delaware Application December 20, 1945, Serial No. 636,170

2 Claims. (Cl. 251—27)

The present invention relates to a novel construction of faucet for controlling the flow of fluid and especially to a novel sealing means and mechanism that may be operated at relatively high pressures without danger of extruding the seal.

Among the objects of the present invention is to provide a novel faucet construction and assembly in which the valve operates on a novel self-sealing principle which is positive in operation and eliminates all danger of extrusion of the resilient sealing element.

A further object of the present invention is to provide a novel sealing element requiring no mechanical or other securing means for retaining it in operative position, thereby facilitating its assembly as well as its removal or replacement, should the occasion arise.

Another object is to provide a faucet with a novel sealing assembly so constructed and arranged that if the valve should be opened when suction exists in the line, such as where faucets in other parts of the system are opened or due to some other hydraulic unbalance in the system, the sealing element will remain in closed position upon its seat and thereby prevent syphoning of dirty water backwardly into the system.

A still further object of the present invention is to provide a novel faucet and sealing assembly in which a movable plunger carried by the valve stem, encompasses the valve seat and is provided with ports for discharge of the fluid. These discharge ports are so disposed or located that upon opening of the valve the resilient sealing element is withdrawn from engagement with its seat prior to opening of the ports, and when the valve is moved to closed position, the ports are closed before the sealing element contacts its seat. This prevents extrusion of the sealing material and effects a self-sealing action which is independent of the amount of pressure applied to the seal by movement of the valve stem.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in vertical cross-section through the novel faucet construction and showing the valve in closed position.

Figure 2 is a fragmentary enlarged view of the valve and its sealing mechanism showing the parts in open position for passage of the fluid.

Referring more particularly to the disclosure in the drawings and the embodiment therein shown to illustrate one form of the novel invention, the faucet 1 comprises a body 2 having a discharge spout or nozzle 3 and an intake 4 for water or other fluid carried in the line or system. A valve stem 5 is threaded at 6 for longitudinal movement and adjustment in a threaded packing nut 7 at the upper end of the faucet body. A handle 8 is secured upon the valve stem by a screw or other attaching means 9 to permit manual opening or closing of the valve. To assure proper sealing between the packing nut 7 and the body 2 of the faucet, a resilient gasket or sealing ring 10 is provided.

The valve stem 5 is provided with an annular recess or groove 11 preferably of substantially V-shape in which is positioned a substantially wedge-shaped resilient sealing ring 12 of such dimensions that it may move or shift laterally within the recess as the stem is raised or lowered in operation. This provides effective sealing between the valve stem and body. The stem is reduced at 13 and provided at its lower end with a coupling part 14 carried in an undercut slot or opening in the upper end of a sleeve-like plunger 15 depending from and carried by the lower end of the stem.

The plunger 15 is guided in its movement by an upstanding tubuluar section 16 formed or provided in the valve body and a substantial amount of radial looseness is permitted in the coupling between the valve stem 5 and the plunger, so that any actual misalignment between these parts will not cause interference in the operation or movement of the plunger. Intermediate its length, the plunger is provided with a plurality of ports 17, and its lower end 18 is adapted to seat against or upon a shoulder 19 formed or provided in the body of the faucet. The ports 17 are so disposed and located about the periphery of the plunger as to be spaced below the upper or seating end 20 of the tubular section 16 when the plunger is in closed position with the lower end 18 seating upon the shoulder 19.

Mounted or positioned within the plunger 15 is a cup-shaped resilient sealing element 21 having an annular depending flange provided with a sealing lip 22 rounded and adapted to seat and seal against the valve seat formed by the upper end 20 of the upstanding tubular section 16. This seal or sealing element is self-sealing in operation and requires no mechanical or other means for retaining it in proper position within the plunger, but is retained therein by the pressure of the fluid in the system.

In the operation of the faucet, turning of the handle raises or lowers the valve stem 5 in the packing nut 7 which is retained in fixed position by its threaded connection to the faucet body 2. Raising or lowering of the valve stem, raises and lowers the plunger 15 through its coupling with the stem. As the plunger is raised, the pressure of the fluid entering through the inlet 4, tends to force the seal 21 upwardly and retains it in that position. As the sealing lip 22 is spaced above the ports 17, this sealing lip will unseat prior to the opening of the ports to the passage 23 in the faucet body, and as these ports reach or become aligned with the upper end 20 of the tubular section 16, flow is permitted or increased through these ports and the fluid in the system discharges through the ports and discharge spout 3.

When the plunger 15 is forced downwardly by moving the handle 9 toward closed position, the ports 17 are first lowered beneath the upper end or seat 20 of the tubular section 16 and then the sealing lip 22 is moved into contact with the seat. As the lip seats thereagainst, the pressure of the fluid under the seal forces its resilient depending flange into the corner formed by the seat or upper end 20 and the interior of the plunger 16, thereby effecting self-sealing independent of the pressure applied to the sealing lip by the plunger and valve stem.

Furthermore, a positive stop is provided in that the shoulder 19 forms an abutment against which the lower end 18 of the plunger 15 contacts after a predetermined amount of compression has been applied to the resilient sealing element 21 between the face or end of the upstanding tubular section 16 and the plunger. This relationship of the parts is important in that it prevents excessive pressure being exerted on the sealing element and thereby prevents damage thereto. As the ports in the plunger are located a substantial amount below the upper end of the tubular part 16, the seal will have completely moved away from its seat before the ports are opened, thereby preventing extrusion of the seal into the port openings.

Having thus disclosed and described the present invention, it will be apparent that it comprehends a novel faucet and sealing construction which although simple in construction and operation, provides optimum sealing at medium and high pressures without danger of damage to the resilient sealing element.

I claim:

1. In a sealing construction for controlling the flow of fluid through a passage, an upstanding member encompassing the passage and provided with a valve seat at its upper end, a recessed plunger closed adjacent its upper end and telescopically and slidably mounted upon said upstanding member for longitudinal movement, an inverted cup-shaped resilient sealing member mounted within and closely conforming to the recessed upper end of the plunger and provided with a depending annular flange having a sealing lip at its lower edge adapted to engage the valve seat of the upstanding member when the plunger is moved to closed position, a positive stop against which the lower end of the plunger engages whereby to limit the compression on the sealing member and prevent its being crushed, and one or more discharge ports in the periphery of the plunger intermediate its ends and disposed below and in spaced relation with the sealing lip with these ports adapted to be uncovered by the telescoping upstanding member when the plunger is moved to open position and to be covered by said upstanding member when the plunger is moved to closed position, and the spacing of the lower end of the sealing lip from the ports being such that when moving the plunger to open position, the seal is broken before the ports are uncovered, and when moving the plunger to closed position, the seal is effected after said ports are covered.

2. In a valve sealing construction for controlling the passage of fluid therethrough, an upstanding tubular member formed in a valve body having an opening providing an inlet therethrough and the upper end of said member providing a valve seat about the outlet, a hollow plunger having an upper end wall and a side wall conforming to and longitudinally slidable upon said upstanding member, a resilient sealing element comprising a base and an integral preformed depending sealing lip disposed in said plunger with the base adjacent said end wall and the outer periphery of said sealing lip entirely supported by said side wall, and said sealing lip projecting toward said valve seat, a fluid conducting port disposed in said plunger beyond the outermost edge of said sealing lip, a positive stop engaged by said plunger for limiting the axial compression on the sealing lip when the plunger is in closed position, and means for causing relative longitudinal movement between said plunger and upstanding member so that the pressure of the fluid first breaks the seal between said sealing lip and the valve seat and upon further movement the port in said plunger passes said seat to permit flow of fluid through said outlet opening.

THOMAS R. SMITH.

REFERENCES CITED

The following references are of record in the file of this patent:

UNITED STATES PATENTS

| Number | Name | Date |
| --- | --- | --- |
| 220,404 | Mern | Oct. 7, 1879 |
| 483,795 | Stevens | Oct. 4, 1892 |
| 772,668 | O'Brien | Oct. 18, 1904 |
| 1,069,871 | Gillett | Aug. 12, 1913 |
| 1,624,186 | Ryan | Apr. 12, 1927 |
| 1,656,772 | Bucknell | Jan. 17, 1928 |
| 1,697,516 | Heleshaw | Jan. 1, 1929 |